United States Patent [19]

Schurman

[11] 4,340,345
[45] Jul. 20, 1982

[54] APPARATUS FOR PREPARING A PARISON AND TRANSFERRING IT TO A MOLDING MACHINE

[75] Inventor: Peter T. Schurman, Woodbridge, Conn.

[73] Assignee: The Plastic Forming Company, Inc., Woodbridge, Conn.

[21] Appl. No.: 115,944

[22] Filed: Jan. 28, 1980

[51] Int. Cl.³ .................. B29C 17/07; B29C 17/16
[52] U.S. Cl. .................................. 425/150; 264/532; 264/542; 425/529; 425/531; 425/532; 425/534; 425/296; 425/297
[58] Field of Search ............... 425/529, 531, 532, 534, 425/296, 297, 302.1, 305.1, 150; 264/532, 542

[56] References Cited

U.S. PATENT DOCUMENTS

| | | | |
|---|---|---|---|
| 3,596,315 | 8/1971 | Yoshikawa et al. | 425/532 X |
| 3,699,199 | 10/1972 | MacDuff | 425/529 X |
| 4,153,408 | 5/1979 | Albert et al. | 425/529 X |
| 4,233,019 | 11/1980 | Sawa et al. | 425/529 X |

*Primary Examiner*—Jan H. Silbaugh
*Attorney, Agent, or Firm*—St. Onge, Steward, Johnston & Reens

[57] ABSTRACT

An apparatus is disclosed for preparing a tubular parison, which is continuously extruded in an extrusion direction from an extrusion head, and for subsequently transferring the parison to a blow molding machine. The apparatus provides improved control of the wall thickness of the parison and can be used with particular advantage in making articles requiring parisons of large diameter and length. The apparatus includes a parison stretching mechanism that grasps and seals the parison at one location along its length and stretches the parison at a controlled rate while being extruded in the extrusion direction. The apparatus also sequentially severs sections of the parison from the remaining continuously extruded portion and transfers each section to a stationary blow molding machine out of the path of this remaining portion. These operations are performed by a parison transfer mechanism that grasps and seals the parison at a second location along its length intermediate the one location and the extrusion head to thereby define a parison section. The section is severed from the remaining portion of the parison, is transferred in a direction transverse to the extrusion direction away from the extrusion head and is subsequently delivered to the molding machine in a direction generally parallel to the extrusion direction.

20 Claims, 16 Drawing Figures

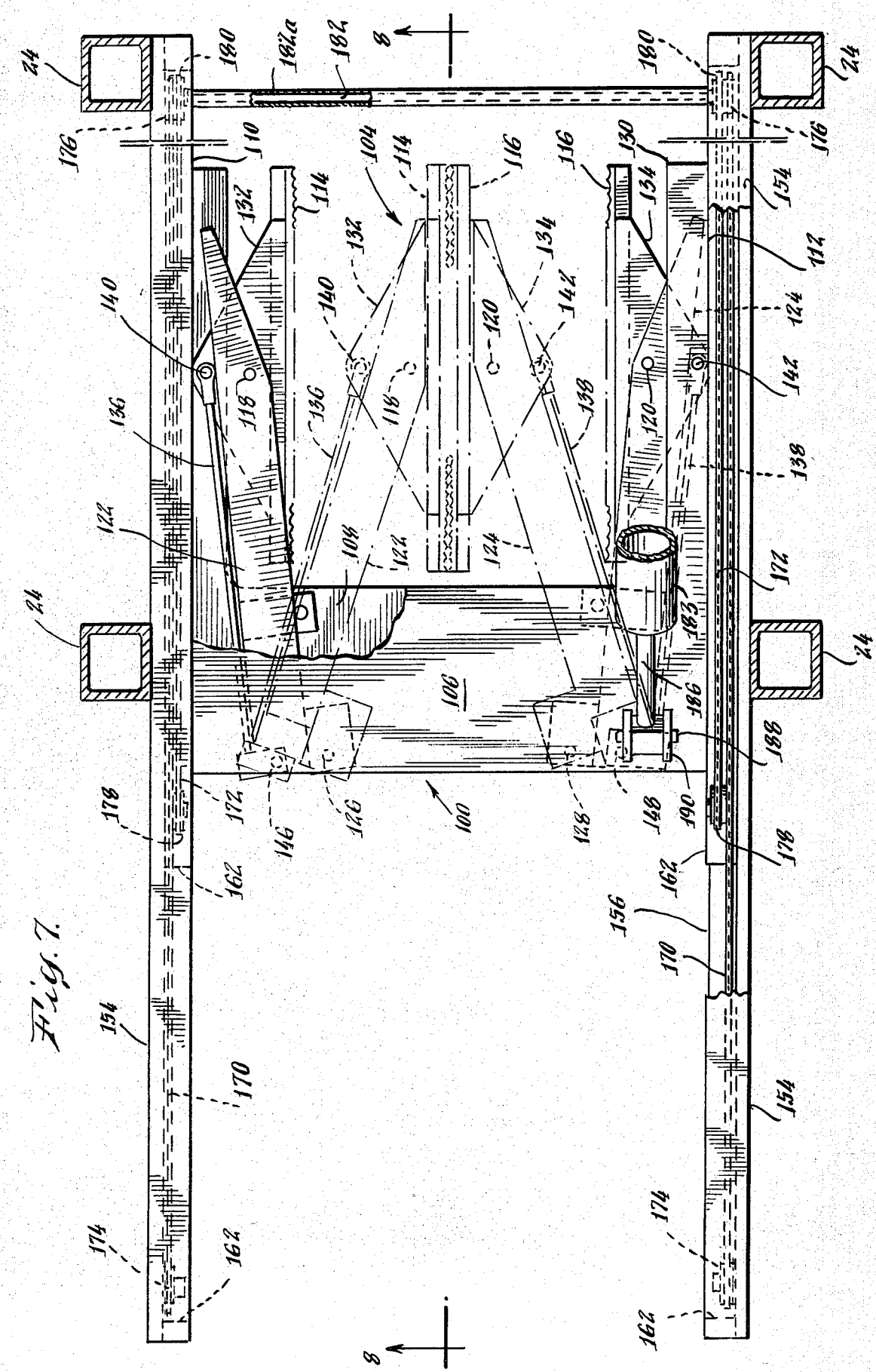

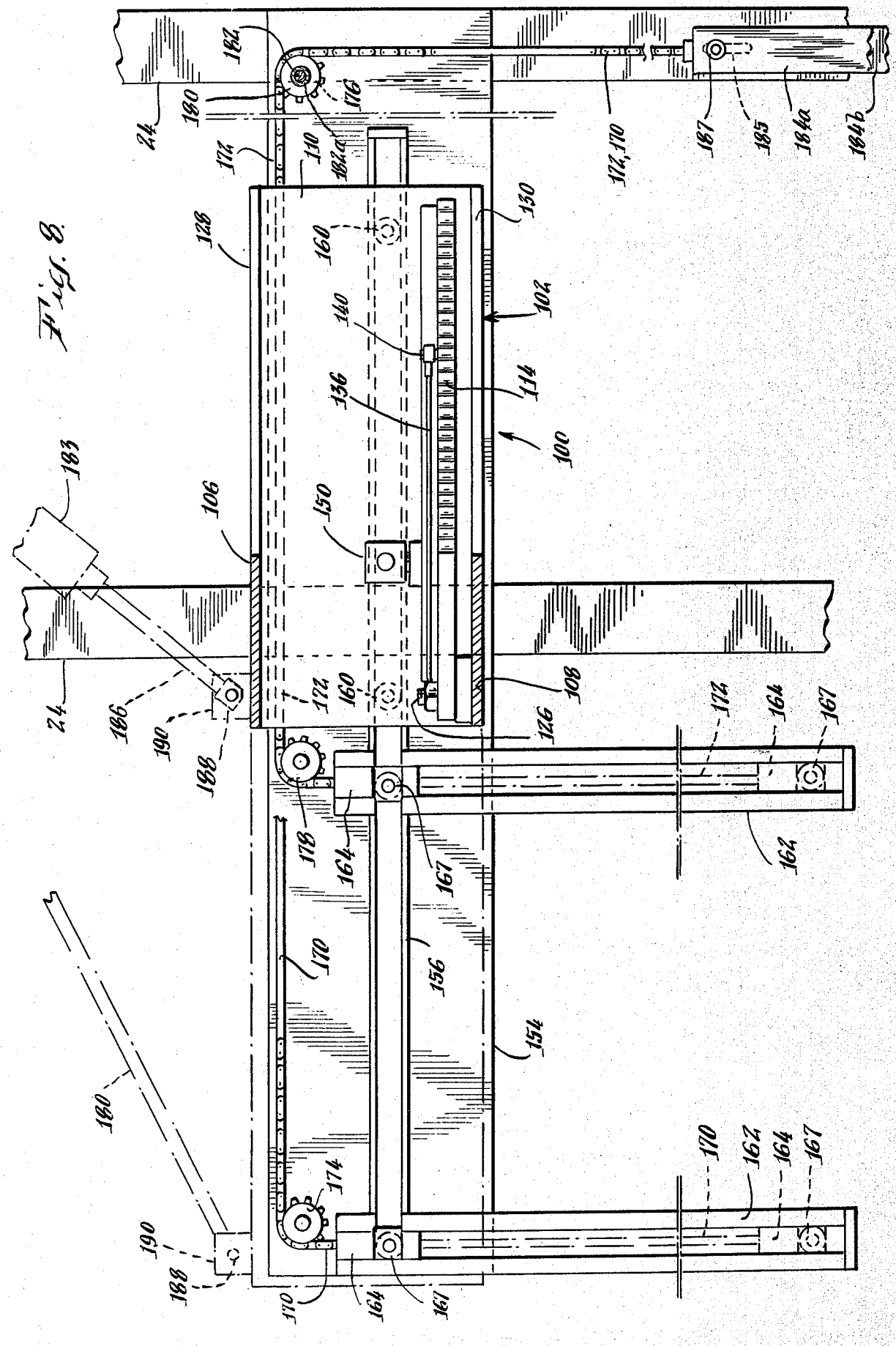

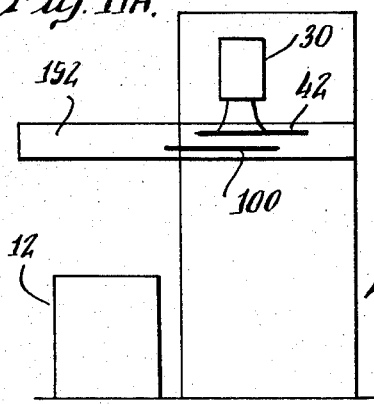 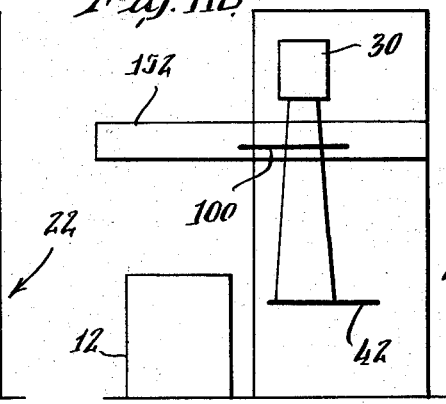 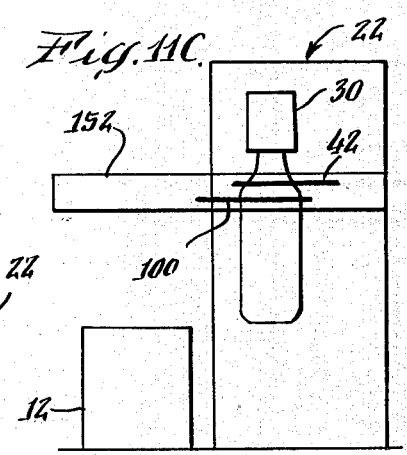 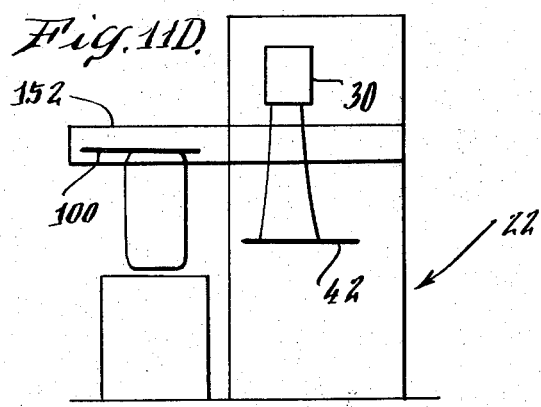 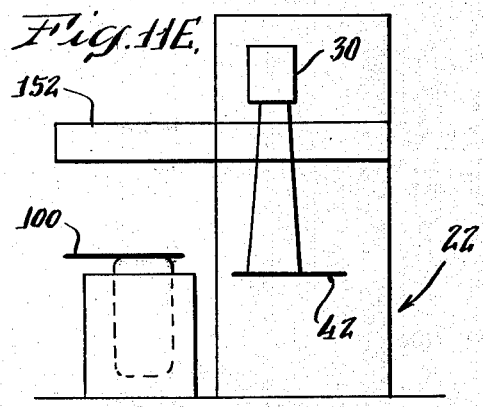
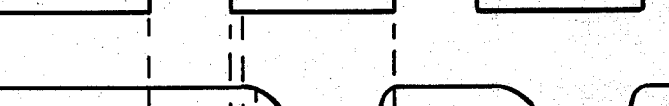

APPARATUS FOR PREPARING A PARISON AND TRANSFERRING IT TO A MOLDING MACHINE

BACKGROUND OF THE INVENTION

1. Field of the Invention

The present invention relates to apparatus for preparing a tubular parison that is continuously, downwardly extruded from an extrusion head and for transferring sections of the parison to a blow molding machine to be formed into articles.

Processes are know for blow molding articles from, for example, molten thermoplastic materials that are downwardly extruded as a tubular parison from an extrusion head. Typically, the parison is divided into discreet sections that are sealed at opposite ends to confine therein a volume of air at pressure slightly above atmospheric pressure. This slightly pressurized air prevents the side walls of the parison from collapsing into contact with each other. Each parison section is then clamped between mating die members in a blow molding machine and air at higher pressure is injected into its interior to expand it against the faces of mold cavities, defining the external shape of the article being made, formed in the mating die members. The molded article is then permitted to cool for a short period of time and is thereafter removed from the mold.

Problems in achieving optimal extrusion and molding efficiency have been encountered in the past because the extrusion process is continuous, but the molding process is not.

Problems in blow-molding articles from tubular parisons have also existed in the past because of difficulties in controlling parison wall thickness. Various factors operative during the extrusion process influence the wall thickness of the parison and often combine to render the wall thickness non-uniform. For example, it has been found that thermoplastic material expands or swells after passing through an extrusion head under pressure. Further, after the thermoplastic material has been extruded from the head, it moves downwardly pushed by other material from the head and pulled by gravity. The longer and heavier the parison becomes, the more material immediately adjacent the extrusion head is elongated. Moreover, the material first extruded from the head is subject to longitudinal contraction through cooling and elastic recovery at an earlier time than subsequently extruded material.

It has been found that these factors can cause a parison extruded from a die head with an intended wall thickness of 0.1 inch to, in fact, have a wall thickness of 0.110 inch at its lower end and of 0.050 inch at its upper end adjacent the extrusion head. Such a parison is unsuitable for molding articles where uniform wall thickness is essential.

2. Description of the Prior Art

Various proposals have been made in the past to meet problems which arise because of the continuous nature of the parison extrusion process and the discontinuous nature of the molding process. Apparatus in accordance with one such proposal includes a molding machine having a plurality of mating die members that are serially moved into position to receive an extruded parison section. While one parison section is molded into an article between mating die members, a second parison section continues to be extruded from the extrusion apparatus. The second section is then molded while the first molded article is stripped from, for example, the first mating die members which are thereafter again ready to receive another extruded parison section.

Another proposal involves mounting the molding machine to move into the proximity of the extrusion apparatus to receive an extruded parison section. Once the mating die members are closed about the parison section, the molding apparatus is moved to a position remote from the extrusion apparatus where the molding process is completed and while a second parison section continues to be extruded.

Apparatus of the types generally described above are not entirely satisfactory because movement of the molding machine requires relatively complex equipment. Moreover, the machine usually has large mass and, therefore, large amounts of energy are needed to move it between molding and parison receiving positions. Movement of the molding apparatus is also time-consuming.

Proposals have also been made in the past for transferring extruded parison sections to molding machines mounted at locations remote from an extrusion apparatus. In one such machine, the blow-molding machine is mounted directly beneath the extrusion apparatus by a distance sufficient to permit a full length parison section to be extruded above the molding machine. The section is then severed from the remaining continuously extruded parison and is transported downwardly into the molding machine where it is formed by mating die members into an article. Extrusion of the parison continues above the molding machine during the molding process. U.S. Pat. Nos. 3,504,396 (Button et al.) and 3,663,672 (Button et al.) disclose an apparatus and method that operate using this principle.

In order to overcome the problems, noted above, of producing a parison having uniform wall thickness, stretching mechanisms have also been proposed. Some such mechanisms stretch the parison in regions where uncontrolled extrusion results in increased wall thickness and support the parison against gravity in regions where decreased wall thickness ordinarily results. However, for reasons which will be explained below, this approach is not entirely satisfactory.

SUMMARY OF THE INVENTION

In its preferred embodiment, the apparatus of the present invention prepares a parison that is continuously extruded from an extrusion head and transfers sections of the parison to a blow molding machine. Specifically, this apparatus controls the wall thickness of the parison so that it may be molded into articles having various sizes and shapes. This apparatus is particularly well adapted to prepare a parison for molding unusually large articles such as, for example, guitar cases out of thermoplastic materials.

The apparatus also transfers parison sections out of the vicinity of the extrusion head so that the continuous extrusion process is not interrupted. Each parison section is ultimately transferred to a molding machine which may be adapted to receive unusually long parison sections. The molding machine is stationary and, therefore, does not require heavy complex equipment to shift it into the region of the extrusion head to receive an extruded parison section. Rather, the apparatus of the present invention is light in weight, relatively uncomplicated, and reliable in operation.

In its preferred embodiment, the apparatus includes a parison stretching mechanism that cyclically operates to first, while in a parison receiving position, grasp and seal the parison at one location along its length. While it is extruded, the parison is then stretched by movement at a controlled rate of the stretching mechanism downwardly to a remote position. The stretching mechanism then releases the parison while at the remote position and returns to the parison receiving position.

The apparatus further includes a parison transfer mechanism that is cyclically operable to first, while in a parison accepting position spaced farther from the extrusion head than is the parison receiving position, grasp and seal the parison at a second location on its length intermediate the one location and the extrusion head to thereby define a parison section. After the stretching mechanism has returned to the parison receiving position and has again grasped and sealed the parison thereat, the transfer mechanism grasps and seals the parison at the parison accepting position and then severs the parison section from the remainder of the parison by transferring the section transversely away from the stretching mechanism and the extrusion head. The transfer mechanism subsequently delivers the parison section downwardly in a direction generally parallel to the downward extrusion of the parison to the molding machine and then returns to the parison accepting position.

The apparatus of the invention provides many advantages because it first transfers parison sections horizontally away from the extrusion head and stretching mechanism and then vertically lowers the parison sections to a stationary molding machine. Therefore, complex and heavy equipment for transferring the molding machine into and out of the vicinity of the extrusion head is eliminated. The transfer mechanism is light, efficient, requires less complex motive equipment and, therefore, uses less energy and requires less maintenance than does equipment for moving a molding machine. Furthermore, because of these factors, the transfer mechanism is capable of more rapid movement than is the molding machine and safety shielding may be provided more easily for the transfer mechanism than for movable molding apparatus.

Because the apparatus of the present invention provides compound movement of the parison section, first in a horizontal and then in a vertical direction, longer parison sections may be molded. Typically, movable molding machines have two tie bars, positioned at diagonally opposed corners of platens that carry the die members for movement toward and away from each other. If horizontal motion only of the parison section to the machine is provided, it is necessary that the bottom of the parison section be initially positioned high enough to clear the lower front tie bar in order to pass properly between the mating die members. However, because the parison section is transferred downwardly by the apparatus of the invention, longer parisons may be molded conveniently without difficulty of passing the lower end of the parison over the lower front tie bar. Moreover, by providing such compound motion for the parison section, the apparatus of the invention efficiently uses space.

The stretching mechanism of the apparatus of the invention also provides precise control of wall thickness of each parison section determined by the rate at which it moves from the parison receiving to the remote location. Usually, parison wall thickness at the extrusion die will be made sufficiently large so that the stretching mechanism may always stretch the parison to varying degrees, even when the stretching mechanism descends at a relatively slow speed. However, in certain cases, the stretching mechanism may be used to support the parison against gravity when the mechanism either descends at a very slow speed or is stopped. The precise control of the wall thickness of the extruded parison also facilitates improved manufacture of large blow molded articles.

Accordingly, it is an objective of the present invention to provide apparatus for preparing a continuously extruded parison to be molded by a blow molding machine.

It is another object of the invention to prepare the parison by dividing it into sections that have generally uniform wall thickness along their length.

It is another object of the present invention to provide a relatively simple apparatus for transferring the extruded and prepared parison sections away from an extrusion head and to deliver the sections to a molding machine, first in a horizontal or transverse direction and then in a vertical direction parallel to that of extrusion of the parison from the head. Thus, the parison section is removed from the proximity of the extrusion head and the path of further extrusion of the remainder of the parison permitting the extrusion process to continue without interruption.

These and other objects of the present invention will be pointed out in or will be understood from the following detailed description provided below and in conjunction with the accompanying drawings.

BRIEF DESCRIPTION OF THE DRAWINGS

FIG. 7 is a top plan view of the parison transfer mechanism which includes two relatively reciprocally movable transfer jaws.

FIG. 8 is a vertical cross-sectional view taken through plane 8—8 in FIG. 7 of the transfer mechanism.

FIGS. 11A through 11E are diagrammatic representations of the apparatus of the present invention at various stages of the cyclical operation.

FIG. 12 is a timing diagram of operation of the various interrelated mechanisms of the apparatus of the present invention.

DETAILED DESCRIPTION OF THE PREFERRED EMBODIMENT

A. Introduction

The apparatus of the present invention for preparing a parison that is continuously, downwardly extruded from an extrusion head and for transferring sections of the parison to a molding machine is generally indicated at 10 in FIGS. 1 through 4. The molding machine with which this apparatus is used is generally indicated at 12 and is mounted in a stationary position on the same support as is the apparatus. The support may, for example, be a floor or platform at any desired location.

Figure 1:
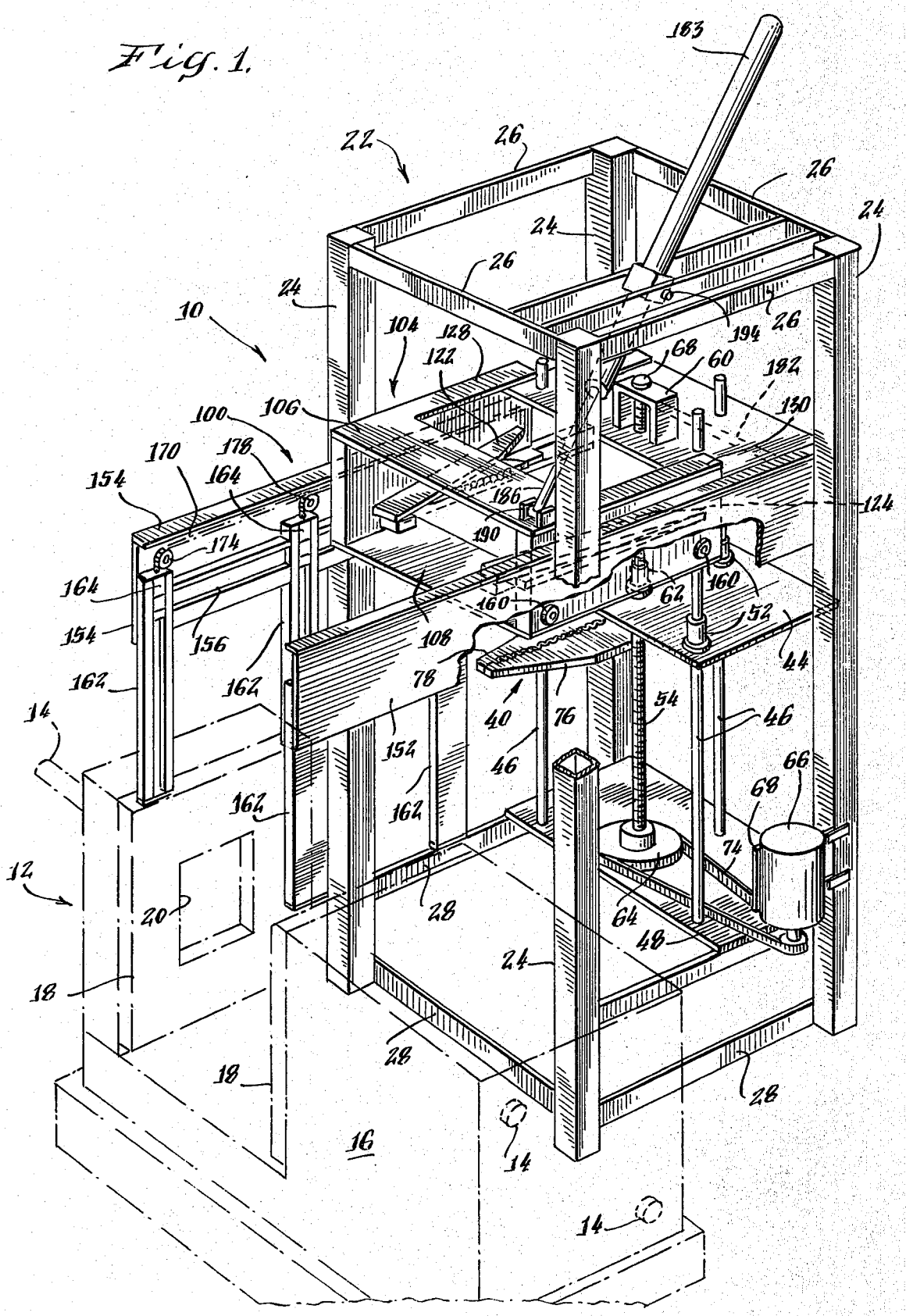
FIG. 1 is a perspective view, partly broken away to show detail of the apparatus of the present invention for preparing a parison section and transferring it to a molding machine.

As shown in FIG. 1, the molding machine 12 includes two tie bars 14 that carry two large platens 16 for reciprocal movement toward and away from each other under motive power supplied by mechanisms (not shown), which may be, for example, pressurized fluid driven piston and cylinder assemblies or mechanical crank mechanisms. The tie bars pass through diagonally opposed corners of the platens, the bar closest to apparatus 10 being positioned at a level lower than that farthest away from the apparatus.

Each platen carries a mold member or die 18 formed with a mold cavity 20. The respective cavities formed in the mating dies together define the exterior configuration of an article to be molded. As is well known, when the parison is delivered to the molding machine, the mold members are closed about it, with it disposed within the mating mold cavities, by reciprocation of the platens. Fluid, usually air, under pressure is injected into the interior of the parison to force the parison walls outwardly into intimate, conforming contact with the surface of the mold cavities to thereby form the desired article.

The apparatus 10 of the invention includes a frame, generally indicated at 22, that comprises four vertically arranged, mutually parallel columns 24, adjacent ones of which are interconnected by horizontally extending, upper and lower support struts 26 and 28 respectively. Diagonally arranged support struts may be used to interconnect adjacent columns for further rigidity of the frame if desired.

Figure 2:
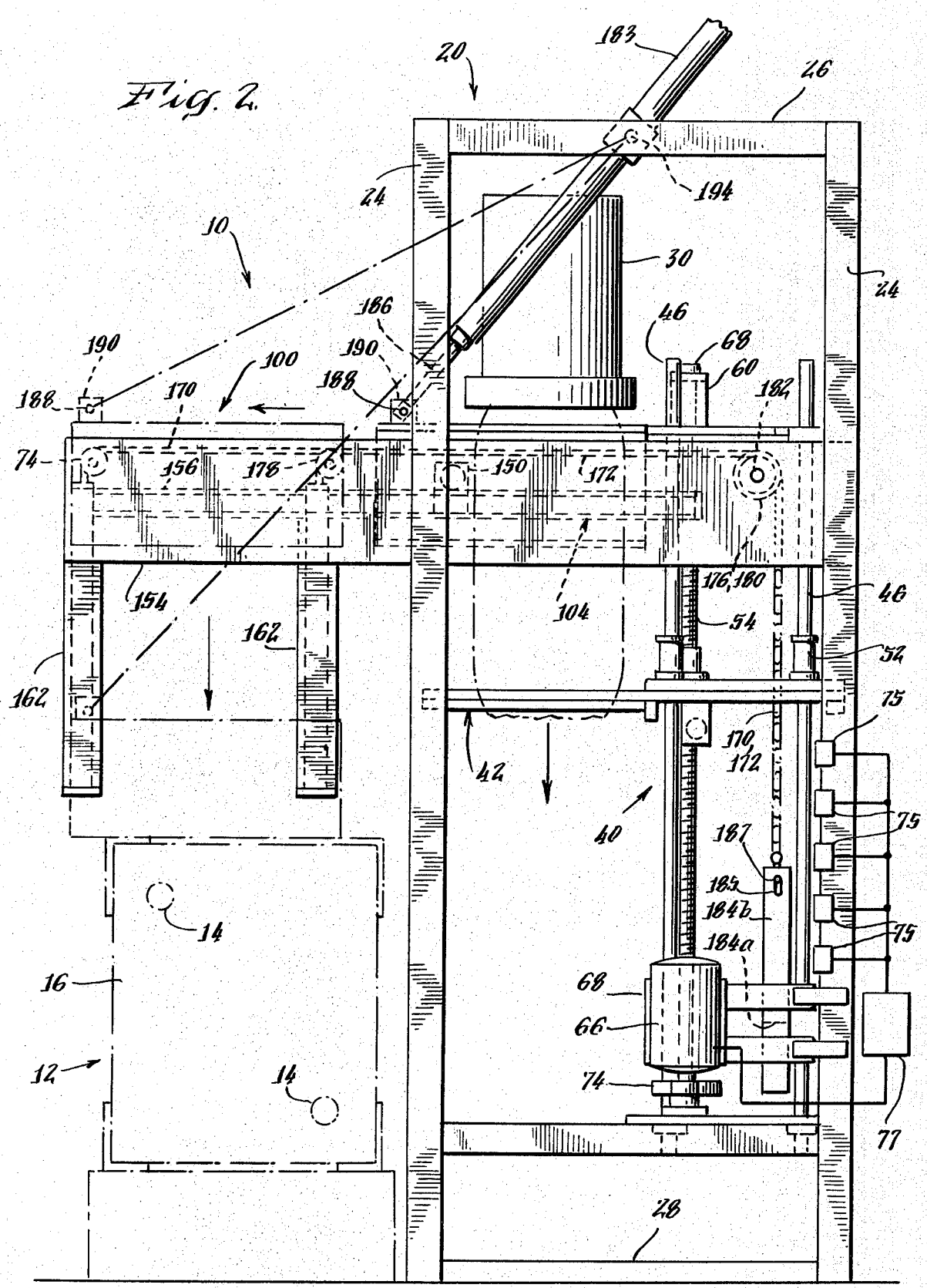
FIG. 2 is a right side elevational view of the apparatus shown in FIG. 1.
Figure 3:
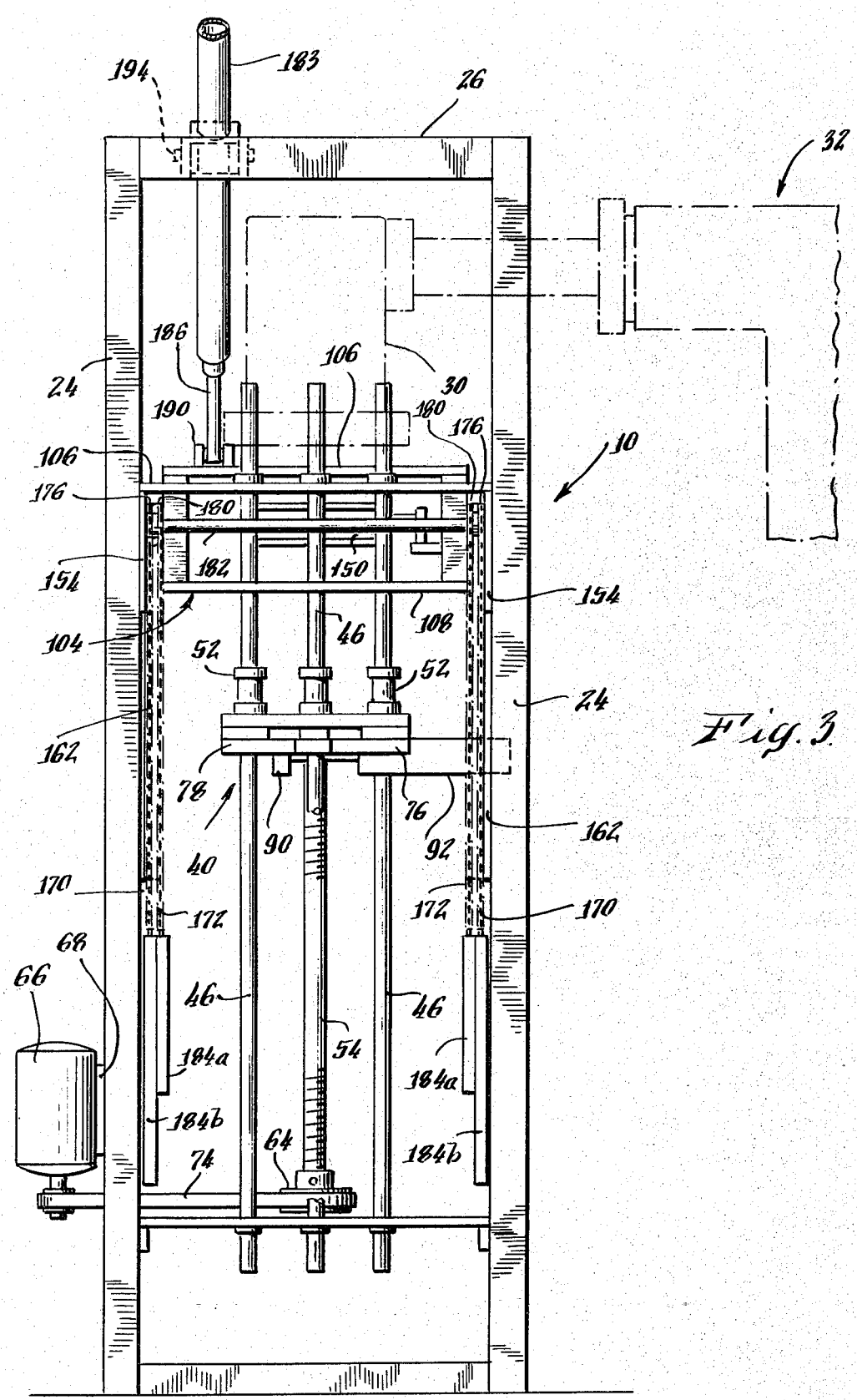
FIG. 3 is a rear elevational view of the apparatus.
Figure 4:
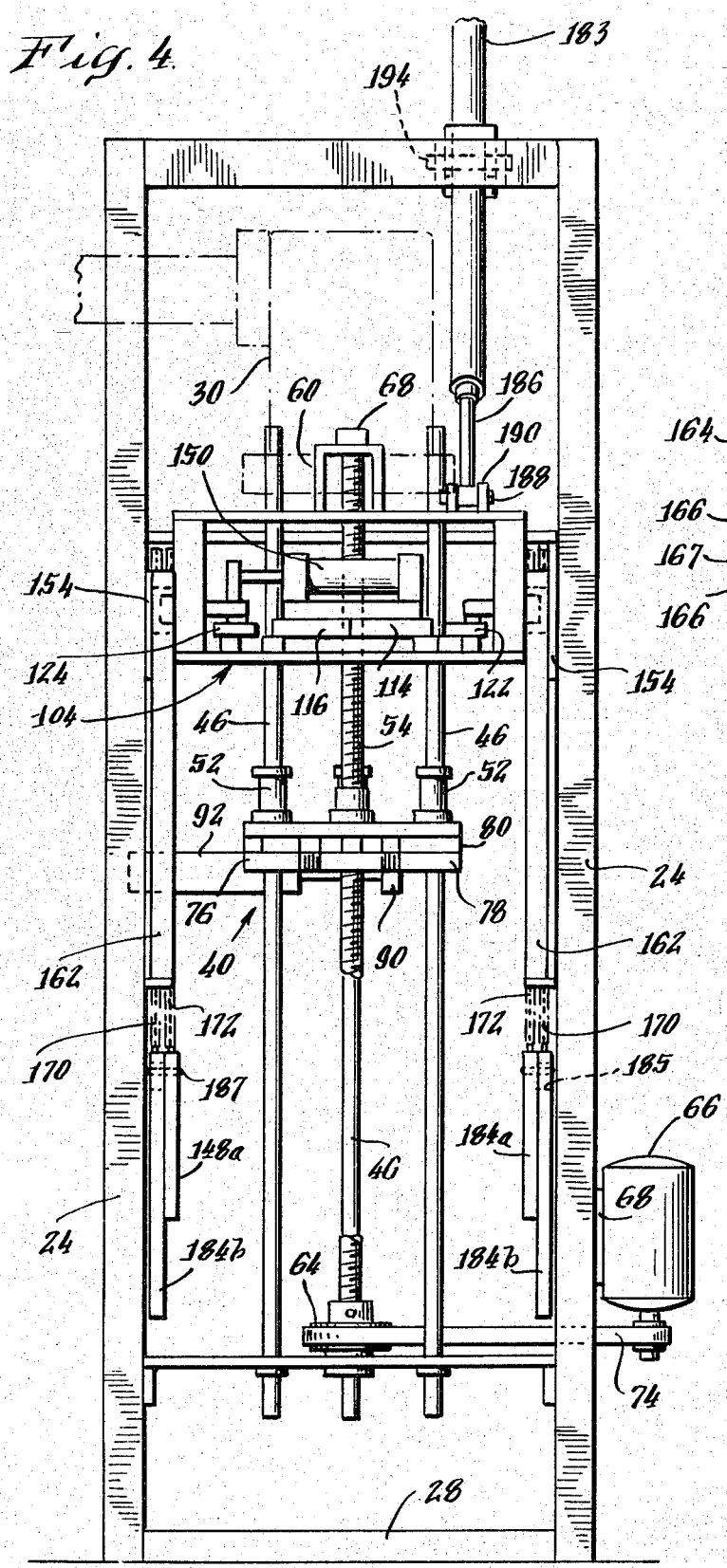
FIG. 4 is a front elevational view of the apparatus.

As can be seen in FIGS. 2 through 4, an extrusion head 30 is positioned within the upper region of the frame defined between the columns and communicates with an extrusion machine generally indicated at 32. The extrusion machine is conventional and supplies molten thermoplastic material to the extrusion head under pressure in any of several known ways. The head includes a ring die from which a cylindrical parison of the molten thermoplastic material is continuously, downwardly extruded, under influence of pressure developed by the extrusion machine, within the interior of the frame. If desired, the extrusion head can be supported by suitable members within the frame. In the preferred embodiment and as is known, a fluid, usually air, is supplied to the interior of the parison at low pressure to prevent the parison wall from collapsing onto itself.

As noted above, the apparatus 10 of the invention further includes a mechanism for preparing the parison by stretching it at a controlled rate as it is extruded from the extrusion head to insure uniform parison wall thickness. The apparatus 10 further includes a transfer mechanism for severing a section of the parison from the remainder thereof after its preparation by the stretching mechanism and transferring it first horizontally and then downwardly and vertically to a position between the open mating die members of the molding machine. Both the parison stretching and parison transferring mechanisms are described below in detail.

B. The Parison Stretching Mechanism

Figure 5:
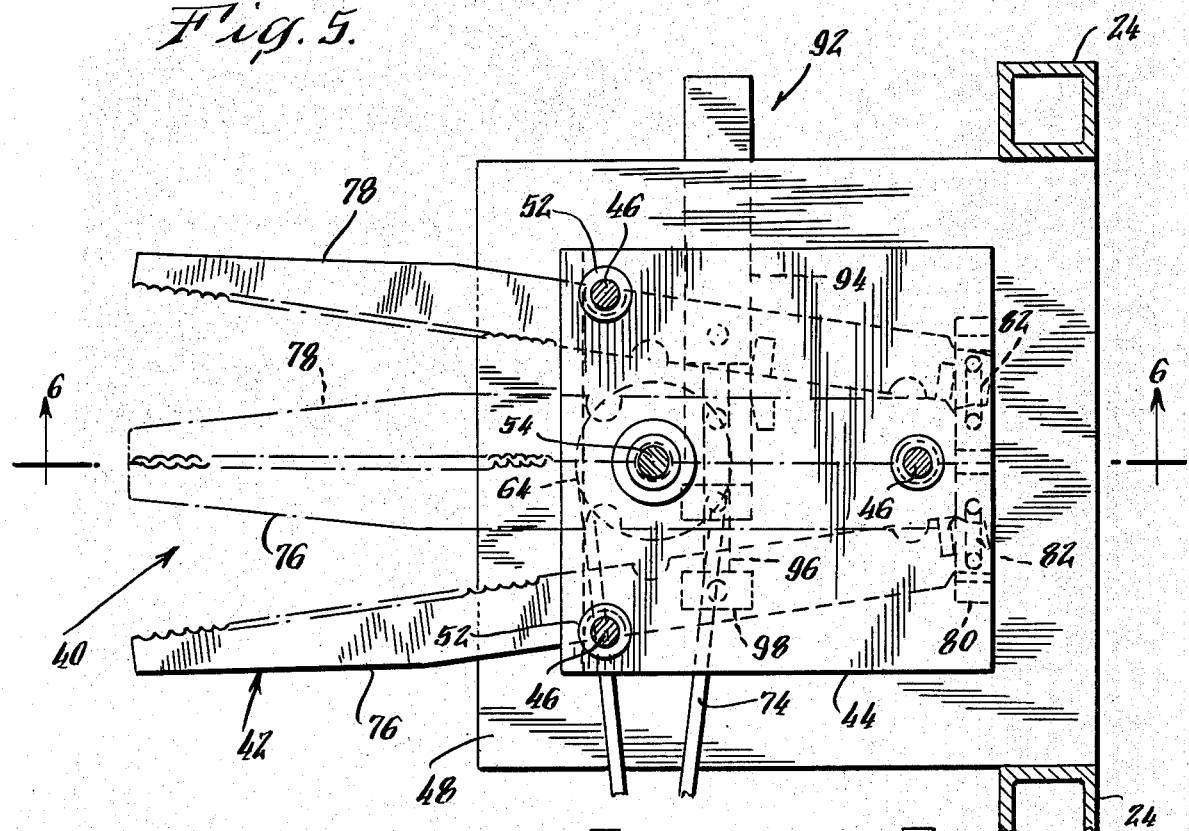
FIG. 5 is a top plan view of the parison stretching mechanism, which includes a pair of reciprocally mounted stretcher jaws.
Figure 6:
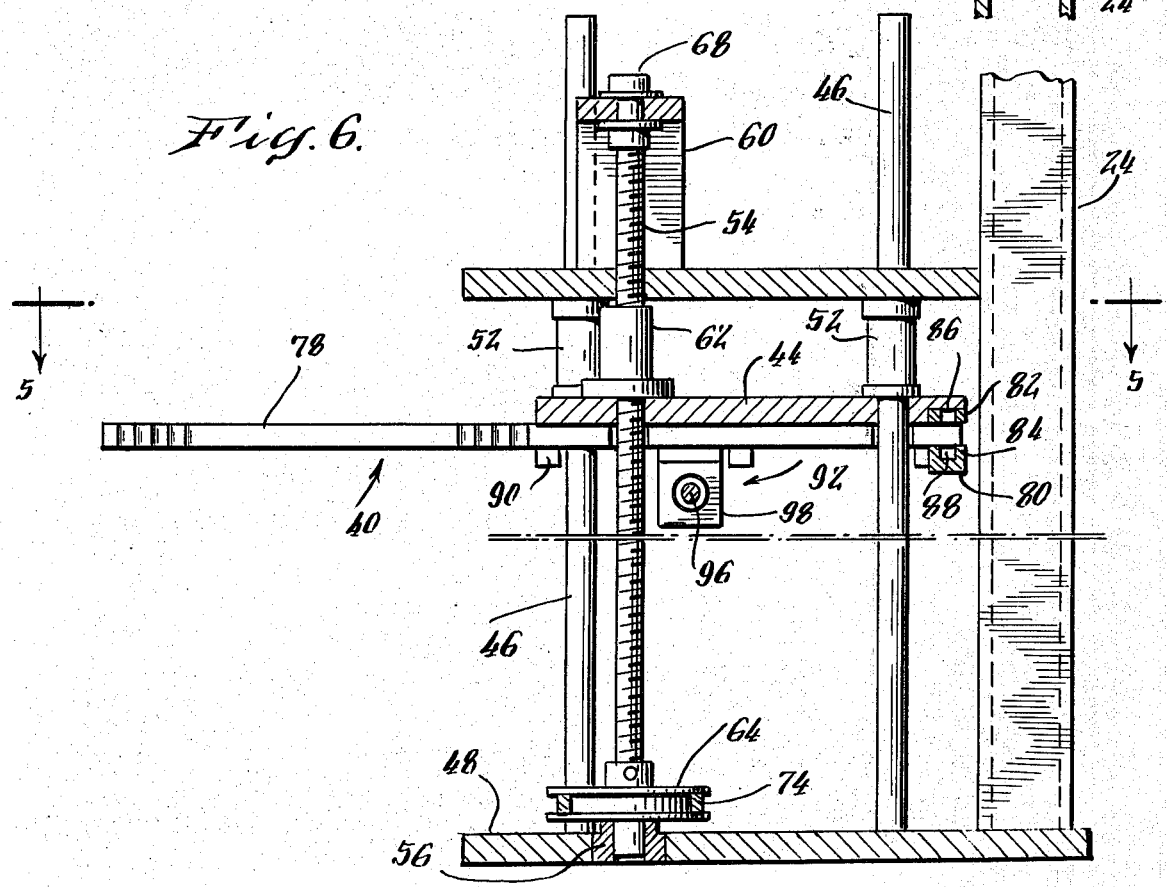
FIG. 6 is a vertical cross-sectional view taken through plane 6—6 in FIG. 5.

The parison stretching mechanism, shown generally in FIGS. 1 through 4 and shown in greater detail in FIGS. 5 and 6, is generally indicated at 40. This mechanism includes a stretcher jaw assembly 42 that comprises a horizontal mounting plate 44 (FIG. 6) which is supported for vertical reciprocal movement on three cylindrical guide bars 46 (FIGS. 3 through 6). The guide bars are mounted to extend in mutually parallel vertical relation between a horizontal base plate 48 secured to the frame at its lower end and a horizontal top plate 50 secured to the frame near its upper end. The mounting plate 44 is provided with three antifriction bushings 52 that embrace the guide bars and facilitate the vertical reciprocal movement.

A jack screw 54 is journalled for rotation between the frame base plate 48 and frame top plate 50 in antifriction bearings, a lower one 56 of which is mounted in the base plate and an upper one 58 of which is mounted in a U-shaped bracket 60 that is secured to the top plate 50. A traveling nut 62 is fixed in non-rotative relation to the stretcher jaw assembly mounting plate 44 and the jack screw 54 is threaded through it. Accordingly, when the jack screw is rotated in antifriction bearings 56 and 58, the mounting plate moves upwardly or downwardly, depending on the direction of rotation of the screw, guided on the guide bars 46 and maintained thereby in a stable horizontal attitude (FIGS. 3, 4 and 6).

A driven toothed pulley 64 is pinned to the jack screw 54 for rotation therewith at its lower end. A direct current (D.C.) electric motor 66 is mounted on a mounting bracket 68 secured to one vertical column 24 of the frame and a toothed pinion 70 is carried on the lower end of the motor shaft 72. A toothed belt 74 interconnects the pinion and the driven pulley 64 so that the motor may supply motive power to rotate the jack screw (FIGS. 3, 4, and 6).

In the preferred embodiment, the motor 66 is capable of different rotary speeds. A series of sensors 75 is mounted on the frame, for example, on one of the columns 24 to be tripped by the stretcher jaw assembly mounting plate 44 as it moves upwardly or downwardly. These sensors are adjustibly positioned to actuate a speed control 77 for the motor to modify the rate of travel of the stretcher jaw assembly in a programmed manner taking into account parameters, which effect the wall thickness of the parison, as well as parameters determined by the particular article being molded.

As shown in detail in FIGS. 5 and 6, the stretcher jaw assembly 42 further includes a pair of stretcher jaws 76 and 78 mounted for pivoted movement on the underside of the mounting plate 44. Specifically, a U-shaped yoke 80 depends from the lower surface of the mounting plate 44 at its rear edge. The yoke is formed with two pair of congruent upper and lower slots 82 and 84 which extend in the direction of the rear edge of the mounting plate 44. Further, the upper slots 82 are colinear and the lower slots 84 are similarly colinear. Each stretcher jaw 76 and 78 is provided with upper and lower pins 86 and 88 that are respectively engaged in upper and lower slots 82 and 84 in the yoke 80. Thus, as can be seen in FIG. 5, the stretcher jaws can be pivoted between a closed position shown in phantom lines and an open position shown in solid lines. The slot pivot mounting arrangement of the stretcher jaws described above permits them to be separated by a larger distance in the open position for their given length than would be possible with a fixed pivot mounting arrangement. Accordingly, this stretcher jaw assembly is space efficient.

The stretcher jaws are further held in sliding contact with the lower surface of the mounting plate 44 by a forward U-shaped yoke 90.

The stretcher jaws are interconnected by a mechanism for moving them between the open and closed positions. In the preferred embodiment, this mechanism is a pressurized fluid actuated piston and cylinder assembly 92, the cylinder 94 of which is attached for pivoted movement to one stretcher jaw 78 and the piston 96 of which is attached for pivoted movement to the other stretcher jaw 76. The piston and cylinder assembly is double acting. That is, it may be actuated to both open and close the stretcher jaws.

As can be seen in FIGS. 5 and 6, ends of the stretcher jaws project a substantial distance beyond the forward edge of the mounting plate 44. The guide bars 46 are positioned within the frame to dispose the projecting ends of the stretcher jaws beneath the extrusion head. Thus, as can be seen in FIG. 2, the stretcher jaws may be closed about a lower end of the parison to grasp and seal it. The jack screw may then be rotated by the motor 66 to move the stretcher jaw assembly downwardly and stretch the parison at a controlled rate in order to prepare the parison for molding.

C. The Parison Transfer Mechanism

The apparatus 10 of the invention also includes the mechanism for severing a prepared parison section from the remainder of the continuously extruded parison, transferring the section laterally away from the extrusion head and stretching mechanism, then vertically delivering it to the molding machine. This transfer mechanism, generally indicated at 100 in FIGS. 1, 2, 7 and 8, includes a transfer carriage, generally indicated at 102 that carries a transfer jaw assembly, generally indicated at 104. The carriage includes upper and lower horizontally oriented, U-shaped frame plates 106 and 108 that are interconnected by vertically oriented side plates 110 and 112 to form a box-like structure open at horizontally opposite ends. The transfer jaw assembly includes two transfer jaws 114 and 116, each of which is mounted for pivoted movement respectively about a pivot pin 118 and 120 carried respectively on a main pivot arm 122 and 124. Each main pivot arm is mounted for pivoted movement on the lower frame plate 108 respectively about pivot pins 126 and 128. As can be seen in FIG. 7, the main pivot arms project from a rear edge of a lower frame plate to mount the transfer jaws for movement within the U-shaped area 130 defined between the upper and lower frame plates.

The transfer jaw assembly further includes an arrangement for ensuring that the transfer jaws move toward and away from each other in constant, mutually parallel relation. Specifically, as can be seen in FIG. 7, each transfer jaw 114 and 115 is formed with a triangular flange 132 and 134 projecting from its rear surface. Stabilizing arms 136 and 138 are respectively secured for pivoted movement to a pivot pin 140 and 142 mounted on the triangular flanges 132 and 134 of the jaws. Each stabilizing arm is, in turn, respectively secured for pivoted movement to a pivot pin 146 and 148 mounted on the lower frame plate 108 of the transfer carriage. The distances between the pivot points on each main pivot arm and between the pivot points on each stabilizing arm are equal. Further, the distances between pivot pins 128 and 148 (126 and 146) and between pivot pins 120 and 142 (118 and 140) are also equal. Accordingly, the main pivot and stabilizing arms for each transfer jaw constitute a parallel arm assembly for holding the transfer jaw in the desired attitude.

As noted above, each transfer jaw is mounted for pivoted movement between an open position shown in solid lines in FIG. 7 and a closed position shown in phantom lines grasping and sealing the parison. An actuator, for example, in the form of a fluid actuated piston and cylinder assembly 150 interconnects the main pivot arms 122 and 124 of the parallel arm assembly to move the transfer jaws between the open and closed positions. Specifically, the piston of the piston and cylinder assembly is secured for pivoted movement to one pivot arm and the cylinder is secured for pivoted movement to the other. The piston and cylinder assembly is double-acting so that the jaws may be positively opened or closed.

The entire transfer carriage including the transfer jaw assembly is mounted for transverse horizontal movement away from and toward a parison accepting position in the vicinity of the extrusion head and for vertical movement at a position horizontally displaced from the extrusion head toward and away from a parison delivering position in the vicinity of the molding machine. As shown in FIGS. 1, 2, 7 and 8, the arrangement for providing this movement includes two horizontally extending, mutually parallel transfer side plates 152 and 154 each of which is secured, for example, by welding to two vertical columns 24 of the frame 22. Each transfer plate has a U-shaped channel that is mounted or formed on its inner face and which constitutes a transverse rail or track.

As can be seen in the figures, the side plates 110 and 112 of the transfer carriage each carry two followers or wheels 160 mounted for rotation on suitable bearings. The wheels are spaced apart by a significant distance and are positioned to be tracked in the respective transverse rail or tracks 156 and 158.

Figure 9:
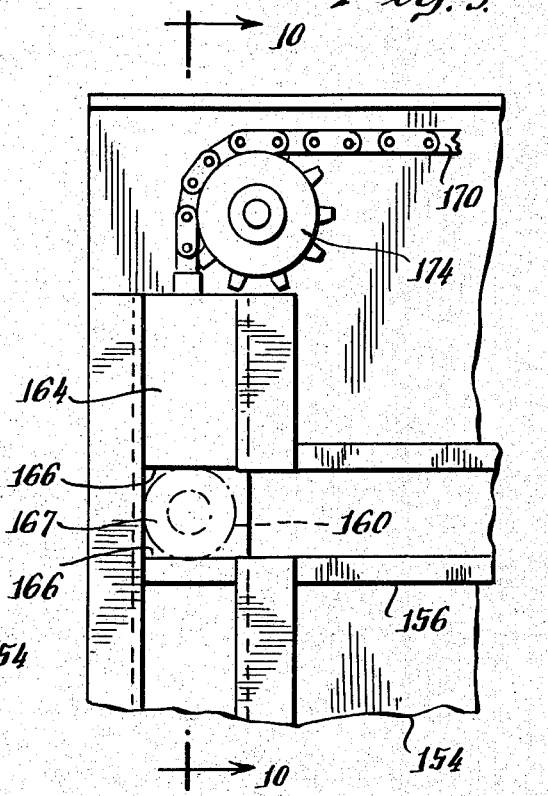
FIG. 9 is an enlarged side elevational view of a portion of the parison transfer mechanism that controls both horizontal and vertical movement of the parison.
Figure 10:
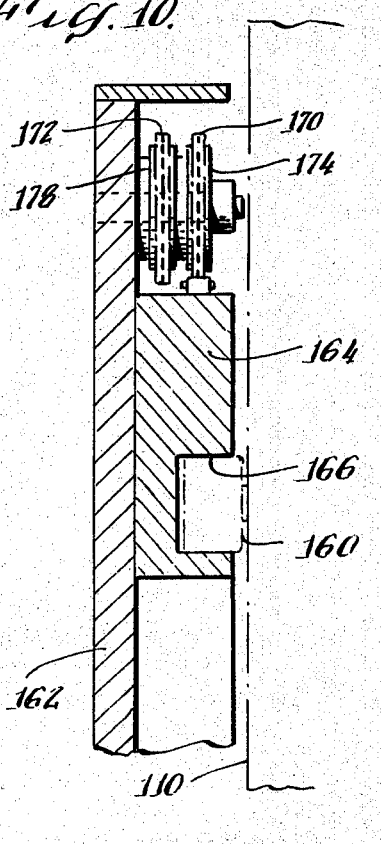
FIG. 10 is a vertical cross-sectional view taken through plane 10—10 in FIG. 9.

The transfer mechanism further includes four vertically depending parallel U-shaped channels or tracks 162 which are mounted on the projecting ends and depend from the transfer side plates 152 and 154. A support block 164 is mounted for vertical, reciprocal, sliding movement in each vertical channel 162 between carriage receiving and carriage delivering positions. As shown in detail in FIGS. 9 and 10, each support block has a recess 166 formed therein that is congruent with and forms an extension of the horizontal channels 156 and 158 when the support block is at its uppermost carriage receiving position (FIGS. 9 and 10). Accordingly, the wheels on which the transfer carriage ride may be tracked along the transverse rails or tracks 156 and 158 into the recesses 166 formed in the support blocks 164. As can be seen in FIG. 8, the vertical channels 162 are mounted so that the sliding support blocks are spaced apart by a distance equal to that between the adjacent wheels on one side of the transfer carriage.

The forward-most vertical channels 162, that is those spaced farthest from the main frame, also include a stop bar 166 that limits the transverse travel of the transfer carriage when the forward-most wheel 160 comes into an engagement therewith.

Accordingly, it will be appreciated that the transfer carriage may be moved horizontally or transversely tracked by the transverse rails 156 and 158 until the forward-most wheels on the transfer carriage abut the stop bars 166. Thereafter the transfer carriage may be moved downwardly by simultaneous downward movement of the sliding support blocks mounted in the vertical parallel channels 162.

The apparatus of this present invention further includes an arrangement for ensuring that all sliding support blocks move downwardly in unison. Specifically, a chain 170 is attached to each forward-most sliding block 164 and a similar, but shorter chain 172 is attached to each rear-most sliding block. Each chain 170 is reeved about forward sprocket 174 and a first rear, outer sprocket 176. Similarly, each shorter chain 172 is reeved about an intermediate sprocket 178 and a second rear, inner sprocket 180.

Each pair of rear sprockets 176 and 180 is mounted for rotation on a shaft 182 and each sprocket of the pair may be rotated independently of the other. The two inner sprockets are, however, rigidly interconnected by a shaft 182a to rotate in unison. Each of the long chains 170 is connected to an individual counterweight 184a and each of the shorter chains 172 is connected to an individual counterweight 184b. The total weight of the counterweights is approximately equal to the total weight of the transfer mechanism 100, the weight of each counterweight being approximately equal to the weight of one quadrant of the transfer mechanism 100. Each counterweight 184a is slotted at 185 to receive a bolt 187 rigidly attached to the other counterweight 184b in each pair of counterweights 184a and 184b.

The four counterweights, with weight distribution approximately that of the transfer mechanism 100, provide for uniform transmittal of force from the motive power supplying means, describe in greater detail below.

If differential resistances to motion exist between the sides of the transfer mechanism 100, shaft 182a will transmit motive force from one side to the other to overcome this resistance. If differential resistances exist between ends of the transfer mechanism, either the front or rear of the transfer carriage will move further on the vertical leg of transfer motion, causing the bolts 187 secured to the counterweights 184 to move to the extreme of the associated slot 185 in associated counterweight of 184a. At this time the full weight of both counterweights 184a and 184b will act to correct irregular movement.

Motive power for moving the transfer carriage transversely away from the extrusion head and stretcher jaw assembly and, subsequently, toward the molding machine in a vertical direction is provided by a pressurized fluid actuated double-acting piston and cylinder assembly 183. The piston 186 of the assembly is mounted for pivoted movement to pivot pin 188 in a bracket 190 secured to the top frame plate 106 of the transfer carriage. The cylinder 192 of the assembly is mounted for pivoted movement to a pivot point 194 mounted in parallel support arms 196 that span the distance between the upper vertical struts 26 of the frame 22. The piston and cylinder assembly 184 is mounted at an oblique angle interconnecting its opposed mounting points on the transfer carriage and frame support arms respectively so that action driving the piston out of the cylinder moves the transfer carriage in the transverse direction and then in the vertical direction within the constraints of the horizontal rails 156 and vertical channels and support blocks 162 and 164. Similarly, retracting action of the piston into the cylinder reverses the movement of the transfer carriage.

Based on the above description, it can be seen that the apparatus of the present invention operates to both stretch and prepare a parison and to sever and transfer parison sections to a molding machine in order to provide the advantages noted above. Moreover, these actions are coordinated in a manner described below.

D. Coordinated Operation of Parison Stretching and Transfer Mechanisms

Coordinated operation of the parison stretcher and transfer mechanisms may be described with reference to FIGS. 11 and 12. FIGS. 11A through 11E are diagrammatic representations of the apparatus of the invention at various stages of its operation and FIG. 12 is a timing diagram of the operations performed by the piston stretching and transfer mechanisms.

As shown in FIG. 12 at time $t_0$, the extrusion of the parison from the extrusion head 30 begins. The stretcher jaw assembly is in the parison receiving position, the stretcher jaws are open, the transfer mechanism is in the parison accepting position, the transfer jaws are in the open position and the mold members are open.

At time $t_1$ the stretcher jaws close about the lower end of the extruded parison. This situation is shown in FIG. 11A.

Immediately thereafter, the stretcher jaw assembly begins moving toward its remote position as shown in FIG. 12. At time $t_2$ when the stretcher jaw assembly reaches the remote position, the stretcher jaws open. This situation is shown in FIG. 11B.

Thereafter, the stretcher jaw assembly returns to the parison receiving position. At time $t_3$, the stretcher jaws move to the closed position about the extruded parison. Immediately thereafter at time $t_4$, the transfer jaws also move to the closed position so that the parison is clamped at two closely spaced positions along its length. This situation may also be depicted in FIG. 11C.

At time $t_5$, the transfer mechanism begins moving from its parison accepting position to its parison delivering position, first in a transverse direction. The transverse motion of the closed transfer jaws away from the closed stretcher jaws tears or severs the parison leaving the separated parison section suspended from the closed transfer jaws. As shown in FIG. 12, the stretcher jaw assembly then again begins to move toward its remote position as it did initially to form the desired wall thickness for the extruded parison section. FIG. 11D shows the situation in which the parison stretcher assembly continues to stretch the extruded parison end and the parison transfer mechanism has been fully transported in a transverse direction.

At time $t_6$, when the transfer mechanism has reached its parison delivering position shown in FIG. 11E, the mold members close around the parison section. Shortly thereafter, the parison transfer jaws open and the parison transfer mechanism returns to the parison accepting position. At time $t_8$, the stretcher jaw assembly has reached its remote position and the stretcher jaws open to begin the cycle again. The cycle continues, as before, until time $t_9$ when the mold members open to release the finished product in anticipation of receipt of a second parison section.

It will be appreciated that the coordinated operation of the various mechanisms of the apparatus of the present invention permits the extrusion apparatus to be operated continuously. Furthermore, as can be seen in the figures, long parison sections may be operated on to permit manufacture of large articles heretofore not capable of being made with prior art apparatus.

Accordingly, although a specific embodiment of the present invention has been described above in detail, it is to be understood that this is for purposes of illustration. Modification may be made to the described apparatus in order to adapt it to particular applications.

What is claimed is:

1. A molding apparatus comprising:
   A. an extrusion head, mounted in a stationary location, for continuously extruding a parison in an extrusion direction;
   B. a molding machine, mounted in another stationary location laterally displaced from and below said extrusion head, for molding sections of said parison into articles; and
   C. a mechanism for preparing a parison as it is extruded in said extrusion direction from said extrusion head and for transferring sections of said parison to said molding machine, said preparing and transferring mechanism including:
      (1) parison stretcher means mounted below said extrusion head for grasping and sealing said parison at one location on its length and for stretching said parison, while being extruded, in said extrusion direction at a controlled rate; and
      (2) parison transfer means mounted for movement between the region of said extrusion head and the region of said molding machine, and being operable for grasping and sealing said parison at a second location on its length intermediate said one location and said extrusion head to thereby define a parison section; for severing said parison section from said parison after being stretched; for transferring said parison section transversely to said extrusion direction away from said extrusion head; and subsequently for delivering said parison section, in a direction generally parallel to said extrusion direction, to said molding machine.

2. A molding apparatus comprising:
   A. an extrusion head, mounted in a stationary location, for continuously extruding a parison in a extrusion direction;
   B. a molding machine, mounted in another stationary location laterally displaced from and below said extrusion head, for molding sections of said parison into articles; and
   C. a mechanism for preparing a parison as it is continuously extruded in said extension direction from said extrusion head and for transferring sections of said parison to said molding machine, said preparing and transferring mechanism including:
      (1) parison stretcher means mounted below said extrusion head and being cyclically operable to
         (a) while in a parison receiving position, grasp and seal said parison at one location on its length;
         (b) stretch said parison, while it is extruded, by moving in said extrusion direction to a remote position at a controlled rate;
         (c) release said parison at said remote position; and
         (d) return to said parison receiving position; and
      (2) parison transfer means mounted for movement between the region of said extrusion head and the region of said molding machine and being cyclically operable to
         (a) while in a parison accepting position spaced farther from said extrusion head than is said parison receiving position, grasp and seal said parison at a second location on its length intermediate said one location and said extrusion head to thereby define a parison section;
         (b) sever a said parison section from said parison by transferring said parison section transversely to said extrusion direction away from said stretcher means and said extrusion head;
         (c) deliver said parison section, in a direction generally parallel to said extrusion direction, to said molding machine and release it thereat; and
         return to said parison acception position.

3. Apparatus as claimed in claim 2 wherein said parison stretcher means comprises a stretcher jaw assembly including two stretcher jaws mounted for relative, reciprocal, pivoted movement between a closed position for grasping and sealing said parison and an open position for releasing said parison.

4. Apparatus as claimed in claim 3 wherein said stretcher jaw assembly further comprises mounting plate means and yoke means secured to said mounting plate means and including, with said stretcher jaws, slot pivot means for mounting said stretcher jaws for pivoted and sliding movement between said closed and open positions.

5. Apparatus as claimed in claims 3 or 4 wherein said stretcher jaw assembly further comprises pressurized fluid actuated, double acting piston and cylinder means interconnecting said two stretcher jaws and operable to move said jaws between said closed and said open positions.

6. Apparatus as claimed in claims 3 or 4 wherein said stretcher means further comprises means for moving said stretcher jaw assembly between said parison accepting and said remote positions.

7. Apparatus as claimed in claim 6 further comprising frame means and wherein said moving means comprises a jack screw mounted for rotation in fixed position in said frame means, a traveling nut mounted on said stretcher jaw assembly and threaded onto said jack screw, and means for rotating said jack screw at a controlled rate.

8. Apparatus as claimed in claim 7 wherein said stretcher means further comprises at least one guide bar mounted in parallel relation to said jack screw, and antifriction bushing means engaged for sliding movement on said bar and mounted on said stretcher jaw assembly.

9. Apparatus as claimed in claim 7 wherein said rotating means comprises an electric motor and belt means for linking said motor to said jack screw.

10. Apparatus as claimed in claim 9 wherein said rotating means further comprises adjustable sensor means spaced along the travel of said stretcher jaw assembly to be tripped by movement of said stretcher jaw assembly therepast and speed control means for adjusting the speed of said motor in response to passage of said stretcher jaw assembly past said sensor means.

11. Apparatus as claimed in claim 2, said transfer means further comprising a transfer jaw assembly including two relatively, reciprocally, movable transfer jaws mounted for movement between a closed position grasping and sealing said parison and an open position releasing said parison.

12. Apparatus as claimed in claim 11, said transfer means further comprising a transfer carriage on which said transfer jaw assembly is mounted, and means for moving said transfer carriage in a first direction transverse to said extrusion direction away from said extrusion head and a second direction generally parallel to said extrusion direction at a location transversely displaced from said extrusion head.

13. Apparatus as claimed in claim 12 further comprising a frame; said transfer carriage further comprising follower means; and said moving means comprising transverse track means mounted on said frame and extending transversely away from said extrusion head, parallel track means mounted with said frame at positions laterally displaced from said extrusion head and extending generally parallel to said extrusion direction, said follower means being guided by said transverse and said parallel track means, means for transferring said follower means between said transverse and said parallel track means, and motive means for moving said transfer carriage with said follower means guided in said respective track means.

14. Apparatus as claimed in claim 13 said follower means comprising two pair of wheels, one pair of wheels being mounted for rotation on opposing sides of said transfer carriage in laterally spaced relation;
said transverse track means comprising one pair of transverse rails each defining a channel within which a pair of said wheels is tracked,
said parallel track means comprising two pair of parallel rails, each pair of parallel rails being mounted with one of said transverse rails and spaced apart by a distance equal to that between wheels in each wheel pair; each parallel rail defining a channel; a support block mounted for sliding reciprocal movement in each parallel rail channel between a carriage receiving position and a carriage delivering position and formed with a recess that is congruent to and defines a portion of transverse rail channel when in the carriage receiving position; means for stopping transverse movement of said carriage when each of said wheels is received in said recess in one said support block; and means for controlling the sliding movement of said support blocks to be in unison.

15. Apparatus as claimed in claim 14, said controlling means comprising chain means connected to each of said support blocks; counterweight means connected to each said chain means; and sprocket means for guiding each said chain means between its associated support block and its associated counterweight means, said sprocket means being linked together so that said support blocks and said counterweight means move in unison.

16. Apparatus as claimed in claim 13, said motive means comprising pressurized fluid actuated, double acting piston and cylinder means connected between said frame and said transfer carriage.

17. Apparatus as claimed in claim 12, said transfer jaw assembly comprising for each of said transfer jaws a main pivot arm, said jaw being mounted for pivoted movement on one end of said main pivot arm which is mounted for pivoted movement at its other end on said transfer carriage, and a stabilizer arm linked for pivoted movement between said jaw and said transfer carriage in generally parallel relation to said pivot arm, the distance between pivot points on said main pivot arm and between pivot points on said stabilizing arm being equal, whereby by said jaws move between said open and closed positions in generally parallel relation.

18. Apparatus as claimed in claim 11, said transfer jaw assembly comprising motive means for moving said transfer jaws between said open and said closed positions.

19. Apparatus as claimed in claim 18, said motive means comprising pressurized fluid actuated, double acting piston and cylinder means linked between said transfer jaws.

20. A molding apparatus comprising:
A. an extrusion head, mounted in a stationary location, for continuously extruding a parison in an extrusion direction;
B. a molding machine, mounted in another stationary location laterally displaced from and below said extrusion head, for molding sections of said parison into articles;
C. a mechanism for preparing a parison as it is continuously extruded in said extrusion direction from said extrusion head and for transferring sections of said parison to said molding machine, said preparing and transferring mechanism including:
(1) parison stretcher means mounted below said extrusion head for grasping and sealing said parison at one location on its length and for stretching said parison, while being extruded, in said extrusion direction at a controlled rate; and
(2) parison transfer means mounted for movement between the region of said extrusion head and the region of said molding machine and being operable for grasping and sealing said parison at a second location on its length intermediate said one location and said extrusion head to thereby define a parison section; for severing said parison section from said parison after being stretched; for transferring said parison section away from said extrusion head; and subquently for delivering said parison section to said molding machine.

* * * * *